United States Patent

[11] 3,550,874

| [72] | Inventor | Thomas F. Sarah |
| | | Akron, Ohio |
| [21] | Appl. No. | 726,356 |
| [22] | Filed | May 3, 1968 |
| [45] | Patented | Dec. 29, 1970 |
| [73] | Assignee | Shakespeare of Arkansas, Inc. |
| | | Fayetteville, Ark. |
| | | a corporation of Arkansas. by mesne assignments |

[54] BAIL ASSEMBLY FOR SPINNING REELS
2 Claims, 8 Drawing Figs.

[52] U.S. Cl. .................................................. 242/84.2
[51] Int. Cl. .................................................. A01k 89/00
[50] Field of Search ........................................... 242/84.2, 84.2G, 84.2F, 84.21

[56] References Cited
UNITED STATES PATENTS

| 2,712,419 | 7/1955 | Martini .................. | 242/84.21 |
| 2,832,550 | 4/1958 | Mauborgne .............. | 242/84.21 |
| 2,942,798 | 6/1960 | Alinari ................... | 242/84.2(G) |
| 3,027,113 | 3/1962 | Berger et al. ............. | 242/84.21 |

Primary Examiner—Billy S. Taylor
Attorney—Hamilton, Cook, Renner & Kenner

ABSTRACT: A bail assembly for spinning reels. A resilient bail is mounted from opposed sockets extending radially outwardly of the flyer for swinging movement between at least a retrieving and a casting position. First and second retaining means are provided in the radially outer edge of at least one of said sockets. A portion of the bail is received in the first of these retaining means when the bail is in the line retrieving position, and a portion of the bail is received within the second of said retaining means when the bail is in the casting position. A releasing cam on the housing of the reel is engaged by the bail upon rotation of the flyer with respect to the housing when the bail is in the casting position. This engagement biases the resilient bail out of engagement with the second retaining means and swings the bail toward the retrieving position. The bail is retained in the retrieving position by receipt of a portion of the bail within the first retaining means. A tensioning cam, inclined radially with respect to the flyer, is provided between the first and second retaining means to facilitate movement of the bail from the first retaining means to the radially outwardly displaced second retaining means, to maintain the bail selectively in the retrieving position and to assure movement of the bail from the casting to the retrieving position when released from the second retaining means. A third retaining means is included on the radially outer surface of at least one of said sockets to provide a storing position for the bail.

PATENTED DEC 29 1970

INVENTOR.
THOMAS F. SARAH
BY Hamilton, Cook,
Renner & Kenner
ATTORNEYS

INVENTOR.
THOMAS F. SARAH
BY Hamilton, Cook,
Renner & Kenner
ATTORNEYS

INVENTOR.
THOMAS F. SARAH
BY Hamilton Cook,
Renner & Kenner
ATTORNEYS

BAIL ASSEMBLY FOR SPINNING REELS

BACKGROUND OF THE INVENTION

The present invention relates to the line pickup mechanism for spinning reels, i.e., the bail assembly.

The axis of the line spool in a spinning reel is oriented substantially parallel to the rod on which the reel is mounted, and the line simply uncoils off the end of the spool to follow the lure during the cast. After the cast a line pickup mechanism engages and winds the retrieved line back onto the spool. Thus, the line storing spool of a spinning reel does not rotate during the cast nor generally during the retrieve.

The most popular pickup mechanism for a spinning reel utilizes a bail assembly. The bail assembly comprises a generally arcuate, metallic half-hoop that is selectively positionable across the face of the spool. The bail is mounted on a rotatable flyer and to prepare the reel for casting the bail is swung away from the face of the spool, about its connection with the flyer, to an open, or casting, position that clears the line spool. As the bail is swung into the casting position it moves against a spring means that constantly urges the bail from the casting position toward the line retrieving position. A trip plate, generally biased by a second spring means, engages a sear to retain the bail in the casting position. After the line and lure are cast, operation of the reel crank actuates a mechanism provided to release the trip plate from the sear so that the spring loaded bail may be returned to the retrieving position across the face of the spool. Continued rotation of the crank rotates the flyer so that the bail, carried on the flyer, winds the retrieved line onto the spool.

Bail assemblies, while highly effective, have heretofore required one or more independent spring means, multipiece linkage arrangements in variously contrived configurations effectively to actuate the trip mechanism that releases the bail from its retracted position upon rotation of the flyer. The various components required in prior known bail assemblies not only add to the manufacturing cost of the assembly but also provide inherent maintenance problems inasmuch as fouling or breaking of any component in the bail assembly will generally make the reel inoperative.

SUMMARY OF THE INVENTION

It is therefore a primary object of the present invention to provide a line pickup mechanism of the bail type for spinning reels.

It is another object of the present invention to provide a bail assembly, as above, that does not require external spring means or mechanical linkage to be automatically moved from the casting to the retrieving position after the cast.

It is a further object of the present invention to provide a bail assembly, as above, in which the bail has a storing position in addition to the casting and retrieving positions.

It is a still further object of the present invention to provide a bail assembly, as above, that is economical to manufacture and maintain and is durable in use.

These and other objects, as well as the advantages thereof over existing and prior art forms, will be apparent in view of the following detailed description of the attached drawings, and are accomplished by means hereinafter described and claimed.

In general, a bail assembly embodying the concept of the present invention is particularly adapted for spinning reels. A spinning reel has a generally nonrotatable spool mounted on the housing and a flyer selectively rotatable with respect to the spool. Rotation of the flyer retrieves the line and winds it onto the spool. The actual retrieving and winding of the line is accomplished by a bail that is mounted on the flyer so as to be movable between a retrieving position, in which it will engage the line, and a casting position, in which it is retracted from engagement with the line.

According to the present invention a resilient bail is swingingly mounted on the flyer. The flyer has a first and second retaining means selectively to maintain the bail in a retrieving and casting position, respectively. A releasing cam on the housing of the reel is engaged by the bail upon rotation of the flyer when the bail is in the casting position. This engagement of the bail with the releasing cam releases the bail from the second retaining means and moves the bail toward the retrieving position where it is held by the first retaining means.

One preferred embodiment of the present invention is shown by way of example in the accompanying drawings and is described in detail without attempting to show all of the various forms and modifications in which the invention might be embodied; the invention being measured by the appended claims and not by the details of the specification.

DETAILED DESCRIPTION OF A PREFERRED EMBODIMENT

Figure 1:
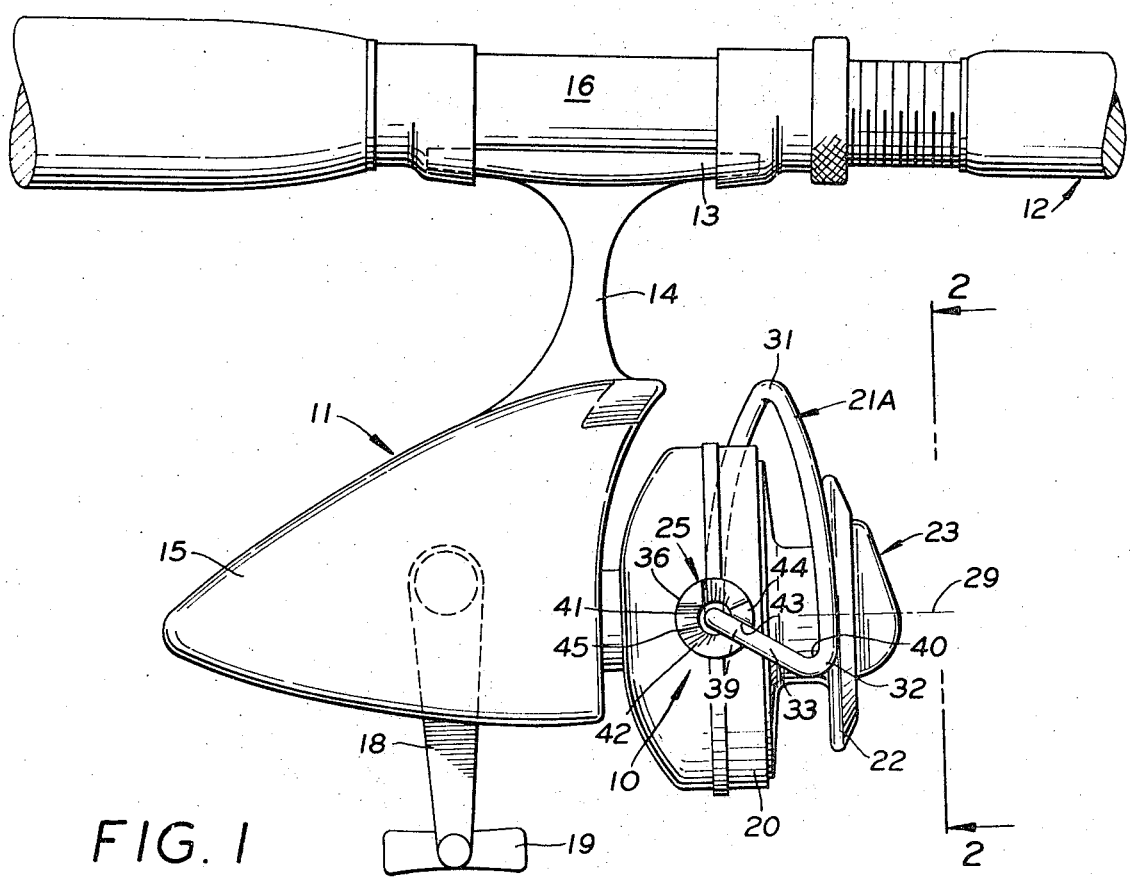
FIG. 1 is a side elevation of a spinning reel supplied with a bail assembly embodying the concept of the present invention, the reel being mounted on a spinning rod and the bail being maintained in the line retrieving position by a first retaining means on the reel flyer.

Referring more particularly to drawings, the improved bail assembly, indicated generally by the numeral 10, is disclosed in conjunction with a spinning reel 11. The spinning reel 11 is adapted to be detachably mounted on the underside of a rod 12, as by a mounting foot 13, in a well-known manner. A mounting leg 14 spaces the reel housing 15 sufficiently below the mounting foot 13 so that the fisherman may grasp the rod handle 16 with the fingers of one hand straddling the mounting leg 14 and positioned between the housing 15 and the mounting foot 13.

A gear train, not shown, within the housing 15 connects the crank arm 18, and handle 19, to the bail assembly 10. Specifically, rotation of the crank arm 18 rotates the flyer 20 on which the bail 21 is carried.

A line storing spool 22 is mounted adjacent, and generally radially inwardly of, the flyer 20. The line spool 22 is normally nonrotatable but may be permitted to rotate selectively, as when playing a fish, by use of a well-known adjustable brake or drag, mechanism 23. Equally well-known constructions may be employed to reciprocate the line spool 22 axially with respect to the bail 21 in order that the retrieved line may be level wound upon the line spool 22.

In FIG. 1 the bail 21 is positioned across the face of the spool 22 in the line pickup, or retrieving, position 21A. The bail 21 is supported from first and second socket means 24 and 25 located in diametrically opposed relation on the flyer 20.

Figure 2:
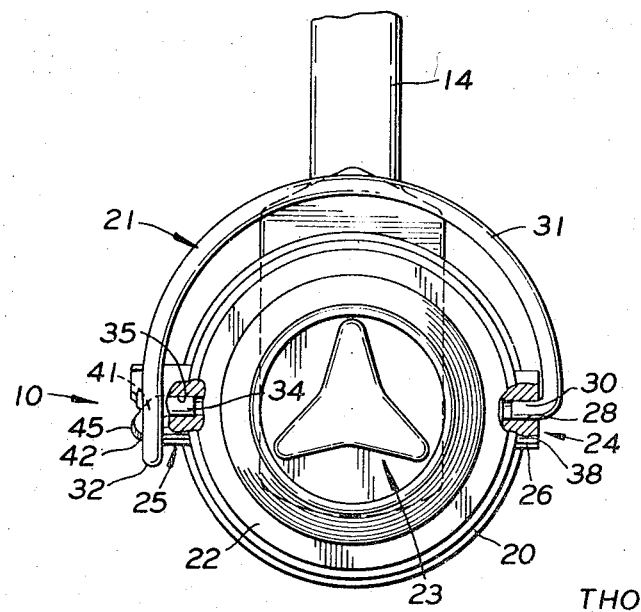
FIG. 2 is a frontal elevation, partly broken away, taken substantially on line 2—2 of FIG. 1.

The first socket means 24 (FIG. 2) may be formed as a boss 26 on the periphery of the flyer 20 with a bearing bore 28 therein oriented generally transversely the rotational axis 29 of the flyer 20. A first journal stub 30 on one end of the bail 21 is rotatably received within the bearing bore 28. From the journal stub 30 the bail 21 extends helically around and forwardly with respect to the flyer 20 to define a lead-in portion 31. The lead-in portion 31 terminates with a crook portion 32 from which an axially inclined follower arm 33 extends rearwardly with respect to the reel to a radially inwardly directed second journal stub 34 opposed to the first stub 30 and rotatably received within a bearing bore 35 in the boss 36 forming the second socket means 25. The second bearing bore 35 is thus also oriented generally transversely the rotational axis 29 of the flyer 20.

While the radially outer edge on the boss 26 of the first socket means 24 presents a generally planar, annular slide surface 38, the radially outer edge on boss 36 of the second socket means 25 is provided with at least two retaining means and a camming surface, all directed radially outwardly with respect to the flyer. The first of the retaining means—a retrieving notch 39—receives the follower arm 33 when the bail 21 is oriented in the line retrieving position 21A depicted in FIG. 1. The retrieving notch 39 is the radially innermost of the two retaining means in the outer edge on the boss 36 of the second socket means 25 and is oriented so that, when received therein, the follower arm 33 extends generally forwardly from the flyer 20 to position the crook portion 32 of the bail 21 radially outwardly of the line spool 22. With the crook portion 32 of the bail 21 so positioned, as the flyer 20 rotates the fishing line slides over the inner bearing surface 40 of the crook portion 32 and is wound onto the spool 22.

Circumferentially spaced at approximately 135° around the annular outer edge of the boss 36 from the retrieving notch 39 is the second retaining means, a casting groove 41. In the frame of reference of the flyer 20, the casting groove 41 is located radially outwardly of the retrieving notch 39. The approximately 135' circumferential portion of the outer edge of boss 36 between the retrieving notch 39 and the casting groove 41 presents a surface inclined as a tensioning cam 42. The intersection of the abutment surface 43 on shoulder 44 with the surface of cam 42 defines the retrieving notch 39.

Figure 3:
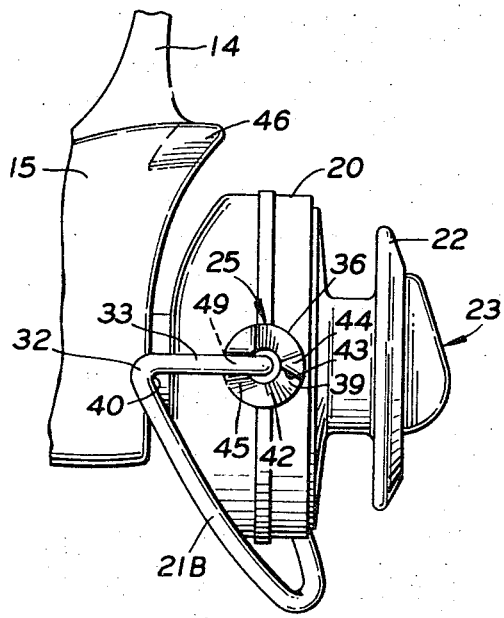
FIG. 3 is a partial side elevation similar to FIG. 1 depicting the bail being maintained in the casting position by a second retaining means on the reel flyer.

To prepare for the cast, the angler catches the line extending forwardly from the crook portion 32 of the bail 21 with the index finger of the hand with which he is grasping the rod handle 16 and with the other hand rotates the bail 21, about the axis of the aligned bearing bores 28 and 35 in the first and second socket means 24 and 25, respectively, from the closed portion 21A away from the face of the line spool 22 to the casting position 21B (FIG. 3). As the bail is swung from the closed to the open position on journal stubs 30 and 34, the follower arm 33 traverses the surface of cam 42 radially outwardly from the retrieving notch 39, past a curbing hump 45 on the surface of cam 42 and snaps into the casting groove 41. This movement spreads the resilient bail 21 such that the journal stubs 30 and 34 thereof tend to move away from each other. Because the bail 21 is made of a resilient material, such as spring steel, these stubs 30 and 34 are biased toward each other by this tensioning, or spreading, of the bail itself. Accordingly, after the follower arm 33 snaps into the casting groove 41 the curbing hump 45 retains the follower arm 33 within the casting groove 41. The bail 21 is therefore retained in the casting position 21B until the application of an external force removes it therefrom.

As shown in FIG. 3, when the bail is in the casting position 21B the follower arm 33 extends directly rearwardly. So positioned, the crook portion 32 lies in proximity to the reel housing 15, the forward portion of which is provided with a releasing cam 46.

Figure 4:
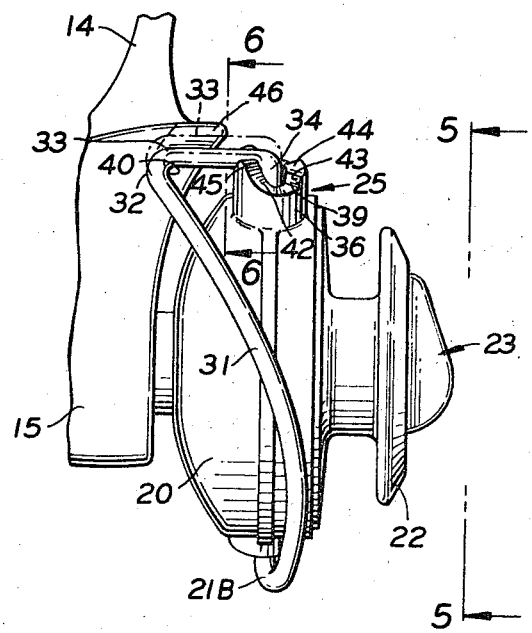
FIG. 4 is a view similar to FIG. 3 with the flyer having been rotated to bring the bail into contact with a releasing cam on the reel housing, the full line representation of the bail depicting its position just preparatory to being released from the second retaining means and the chain line representation depicting the bail the moment it is released.
Figure 5:
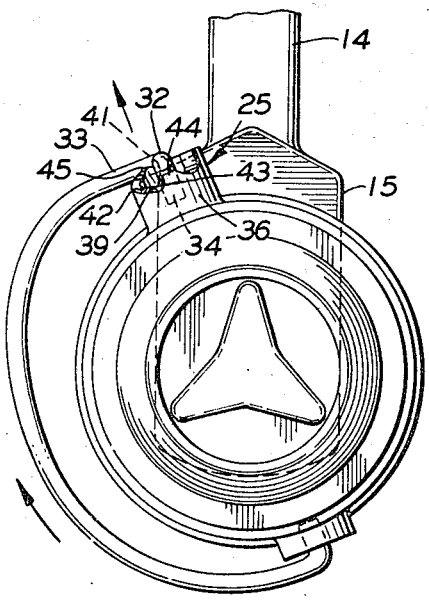
FIG. 5 is a frontal elevation taken substantially on line 5—5 of FIG. 4.
Figure 6:
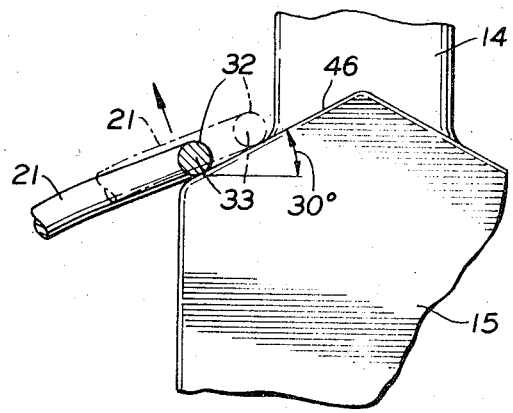
FIG. 6 is an enlarged cross section taken substantially on line 6—6 of FIG. 4 depicting the interaction of the bail with the releasing cam on the reel housing.

After the cast, and as the fisherman rotates the crank arm 18 to begin the retrieve, concomitant rotation of the flyer 20 moves the follower arm 33, and crook portion 32, of the bail 21 against the releasing cam 46. With the bail 21 thus engaging the releasing cam 46 rotation of the flyer 20 causes the follower arm 33 to slide along the inclined surface of the releasing cam 46, as from the solid line to the chain line representations of FIGS. 4 and 6. This interaction of the follower arm 33 with the releasing cam 46 thereby spreads the bail so as to move the follower arm 33 radially outwardly of the curbing hump 45. For best results it has been found that the angle at which the bail 21 engages the releasing cam 46 should not exceed 30°, as shown in FIG. 6.

Concurrently with this radially outward movement of the follower arm 33 to clear the curbing hump 45, the engagement of the follower arm 33 with the releasing cam 46 during rotation of flyer 20 causes the bail 21 to begin to retrorotate from the casting position 21B toward the retrieving position 21A.

As soon as the flyer 20 has rotated sufficiently that the follower arm 33 will clear the curbing hump 45, and even after the follower arm is swung out of contact with the releasing cam 46, the resiliency of the bail itself will cause the follower arm to slide along the tensioning cam 42 until it bears against the abutment surface 43 on shoulder 44. The bail 21 is retained in this, the retrieving position 21A, by the resiliency of the bail itself which maintains the follower arm at the radially innermost extent of cam 42, i.e., in the retrieving notch 39. Thereafter, rotation of the flyer 20 also causes the line to slip along the lead-in portion 31 of bail 21 until it is received against the bearing surface 40 on the crook portion 32 from which it winds onto the line spool 22.

The unique bail assembly may also provide a ready storing position for the bail. Specifically, the bail 21 may be folded back against the reel housing 15 (FIG. 7) so that it is not only protected but sufficiently out of the way to permit the reel to be packed in a much smaller space than comparably sized prior art spinning reels.

A third retaining means in the form of a storing depression 47 is provided in the outer edge of the boss 36 in addition to the two retaining means 39 and 41, and also is directed radially outwardly of the flyer 20. The storing depression 47 is also circumferentially spaced from the retrieving notch 39 around the annular outer surface of boss 36 but in the opposite direction from the casting groove 41. Continuing with the flyer 20 as a frame of reference, a positioning cam 48 is formed on the outer edge of the boss 36 and extends from the radially outer extent of the shoulder 44 radially inwardly and circumferentially to a stop shoulder 49 that separates the storing depression 47 from the casting groove 41.

Figure 7:
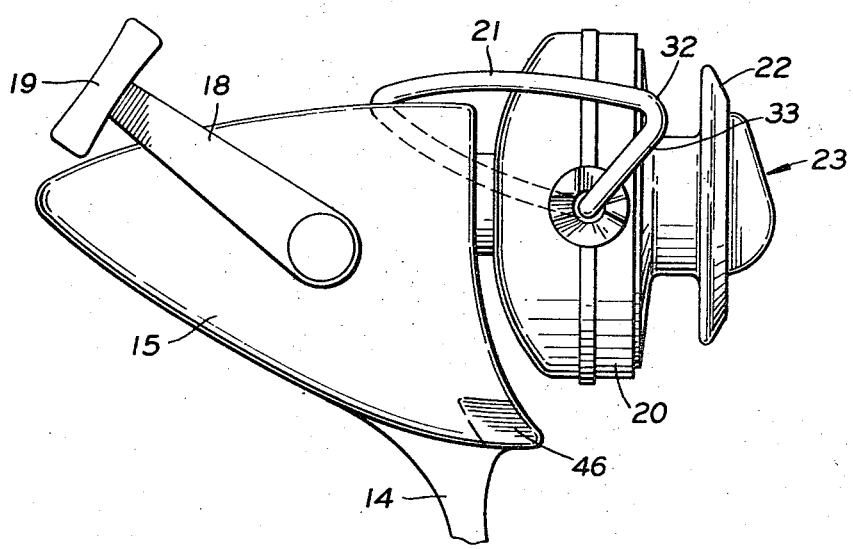
FIG. 7 is a side elevation depicting the reel with the bail being maintained in the storage by a third retaining means on the reel flyer.
Figure 8:
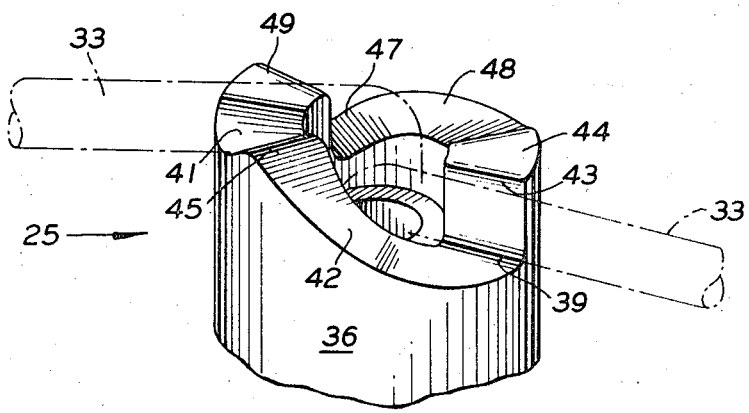
FIG. 8 is an enlarged perspective of a flyer mounted boss that incorporates the three retaining means.

To store the bail 21, the flyer 20 is rotated so that the socket means 24 and 25 are oriented generally transversely of the mounting leg 14 with the bail 21 in the retrieving position 21A but on the opposite side of the reel from the mounting leg 14. In this position, as depicted in FIG. 7, the angler lifts the follower arm 33 radially outwardly of the flyer 20 and over the stop shoulder 44 with his finger and onto the positioning cam 48. Here too the hooplike resilience of the bail 21 causes it to bias the follower arm 33 against and along the positioning cam 48 until the bail reposes against the housing 15. Because of this biasing of the follower arm 33 against the radially inclined positioning cam 48 the bail is maintained snugly against the reel housing 15.

A bail assembly embodying the concept of the present invention thus provides an economical and durable construction that does not require external spring means or complex mechanical linkage for the bail to be automatically movable between the casting and retrieving positions upon rotation of the flyer and otherwise accomplishes the objects of the invention.

I claim:

1. A bail assembly for a spinning reel having a housing, a line spool supported thereon, a flyer mounted on the housing, the flyer being rotatable with respect to the line spool, said bail assembly comprising, at least one socket means in the form of a boss extending radially of said flyer on which it is mounted, a resilient bail, said bail mounted on the socket means for movement between a casting, a retrieving and a storing position, said boss having a radially outer edge provided with a retrieving notch, casting groove and a storing depression, a follower arm on said bail receivable in said retrieving notch to maintain said bail in the retrieving position, said follower arm on said bail selectively receivable in said casting groove to maintain said bail in the casting position, said follower arm on said bail selectively receivable in said storing depression to maintain said bail in the storing position, a releasing cam on the housing, rotation of the flyer when said bail is in the casting position forcing a portion of the bail against said releasing cam to release said bail from the casting groove and move said bail to the retrieving position, said bail being manually movable from said retrieving position to said storing position.

2. A bail assembly, as set forth in claim 1, in which a second boss extends radially outwardly of said flyer in opposition to said second boss having a generally planar slide surface on the radially outer edge thereof, said bosses provided with aligned bearing bores, said bail having opposed journal stubs, said journal stubs being rotatably received within said bearing bores to permit said bail to swing thereabout.